(12) United States Patent
Froger et al.

(10) Patent No.: US 6,318,826 B1
(45) Date of Patent: Nov. 20, 2001

(54) DEVICE FOR DETERMINING A QUANTITY OF CONSUMABLE PRODUCT, NOTABLY INK, PRESENT IN A RESERVOIR WITH A NUMBER OF COMPARTMENTS, AND CORRESPONDING DOCUMENT PRINTING DEVICE

(75) Inventors: Marie-Hélène Froger, Chateaugiron; Pascal Coudray, La Chapelle des Fougeretz, both of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/104,269

(22) Filed: Jun. 25, 1998

(30) Foreign Application Priority Data

Jun. 27, 1997 (FR) .................................................. 97 08128

(51) Int. Cl.[7] .......................... G41J 25/308; G41J 29/393
(52) U.S. Cl. .................................................. 347/7; 347/19
(58) Field of Search ............................. 347/7, 8, 19, 86, 347/41, 42; 73/304 C; 399/27; 340/618

(56) References Cited

U.S. PATENT DOCUMENTS 4,700,754 * 10/1987 Kringle ................................. 141/95

6,095,629 * 6/1998 Froger et al. ............................ 347/7

FOREIGN PATENT DOCUMENTS

| 28399 | 5/1981 | (EP) . |
| 658431 | 6/1995 | (EP) . |
| 672528 | 9/1995 | (EP) . |

* cited by examiner

*Primary Examiner*—John Barlow
*Assistant Examiner*—Charles W. Stewart, Jr.
(74) *Attorney, Agent, or Firm*—Fitzpatrick, Cella, Harper & Scinto

(57) ABSTRACT

Determination of the quantity of liquid product contained in a reservoir, with the help of a capacitive arrangement.

The invention is applicable to a reservoir (112) comprising a compartment (166) where the product is in the captive state, for example impregnating a porous body, and the conductive electrodes (221, 222) associated with this compartment are situated on either side of the volume where the product is in the captive state and offset with respect to one another in order to be located respectively in the vicinity of two opposite ends of this volume.

When the reservoir has another compartment where the product is in the free state, the electrodes of the capacitive arrangement are advantageously L-shaped.

34 Claims, 6 Drawing Sheets

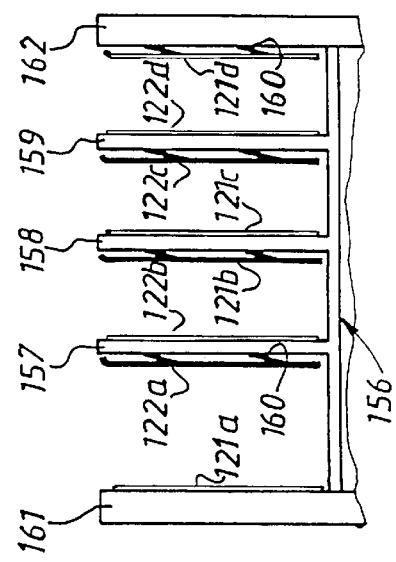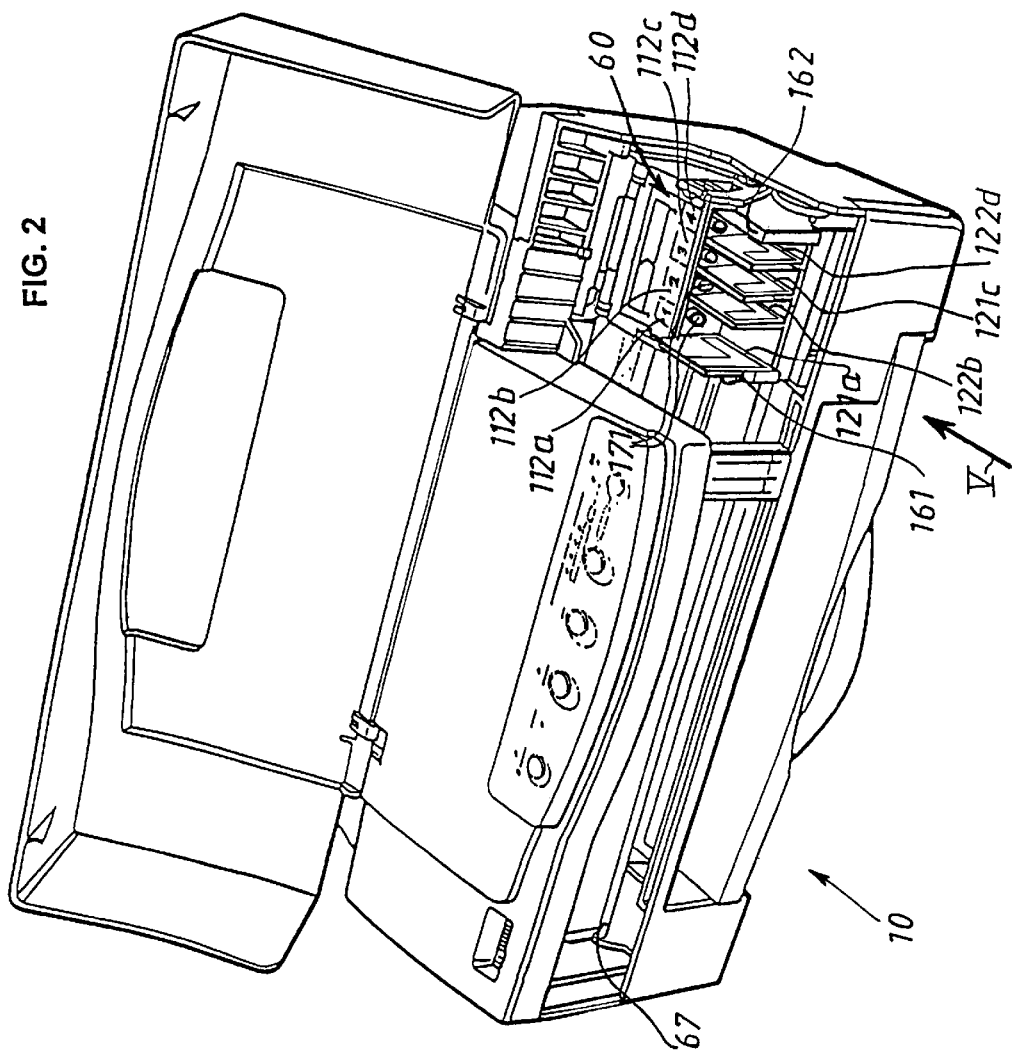

DEVICE FOR DETERMINING A QUANTITY OF CONSUMABLE PRODUCT, NOTABLY INK, PRESENT IN A RESERVOIR WITH A NUMBER OF COMPARTMENTS, AND CORRESPONDING DOCUMENT PRINTING DEVICE

BACKGROUND OF THE INVENTION

The invention relates to a device for determining a quantity of consumable product present in a reservoir comprising for example at least two compartments, one where the product is in the free state and the other where it is in the captive state.

The invention relates particularly to determination of the quantity of ink remaining in such a reservoir equipping a printing device, more particularly a printing device using ink-jet technology.

A number of ways for detecting a level of ink in a reservoir of a printing device are known. Notably, association with the reservoir is known of a capacitive arrangement to which an excitation signal, generally a high-frequency alternating signal, is applied. It is known that the signal transmitted by such a capacitive arrangement varies according to the quantity of ink remaining in the reservoir. This variation can therefore be used to indicate to the user the fill level of the reservoir or at least the fact that a minimum level has been reached. Such information allows the user to refill the reservoir or to change a cartridge comprising such a reservoir often associated with an ink-jet print head. The capacitive arrangement is such that at least one capacitor of relatively small capacitance (a few picofarads) is constituted so that the reservoir is located or can be located at a given instant between electrodes of such a capacitor.

By way of example, the document EP 0 028 399 describes a method for detecting the minimum level of ink in a reservoir, using a resonant circuit, the capacitor of which is formed by two metal plates (electrodes) between which the ink reservoir is located. The latter therefore fills the dielectric space of such a capacitor and the quantity of ink has a direct effect on the permittivity of the said dielectric space, and therefore the value of the capacitance. The resonant circuit is calibrated so that its resonant frequency and the maximum voltage at its measurement resistance are reached when the level of ink has fallen to a predetermined value. When resonance is achieved, a signal which can be used for signalling is sent. Consequently, with such a system, the only information available is an indication of the fact that the ink level is or is not above a predetermined low threshold.

A reservoir made of insulating material is also known, comprising two compartments, respectively an upstream compartment where the consumable product (conductive ink) is in the free state and a downstream compartment where the same product is in the captive state, that is to say for example impregnating a porous body. The two compartments communicate by means of a passage while the downstream compartment filled with a porous body communicates with a flow output for consumption of the said product. As is known, the porous body makes it possible to better control the flow of the liquid to the device consuming this liquid, in particular the ink-jet print head in the case of a document printing device.

On the other hand, a larger quantity of ink can be stored, all things being equal in other respects, in the upstream compartment which lacks a porous body. The liquid contained in the upstream compartment is progressively absorbed by the porous body as the liquid flows out of the downstream compartment.

When the upstream compartment is empty, the porous body progressively contains less in liquid product, until it is completely drained.

SUMMARY OF THE INVENTION

One aim of the invention is to indicate a measurement of the quantity of consumable product remaining in the reservoir until it is completely or practically completely drained of product, throughout the duration of use, that is to say before and after the compartment is drained, in order to allow the user to fill the reservoir again or to change it, at the proper moment.

According to the invention, these aims are achieved by the particular structure of the capacitive arrangement associated with such a compartmental reservoir, where the consumable product is electrically conductive.

This is because, where the consumable product, that is to say the ink, is an electrically conductive product, and where the walls of the reservoir are made of insulating material, the capacitive arrangement indicated above can be constituted by one or more capacitors. Each capacitor is in fact defined by a metallic external conductive electrode, applied against a face of the said reservoir, on the one hand, and by the conductive liquid itself contained in the reservoir and constituting another electrode, the surface area of which is, as it were, variable and depends on the quantity of product contained in the reservoir at a given instant. In this case, the dielectric of the capacitor is constituted by the insulating wall of the reservoir.

More particularly, the invention concerns a device for determining a quantity of electrically conductive liquid consumable product contained in a reservoir made of insulating material, comprising at least one volume where the said product is in the captive state, of the type also having a capacitive arrangement including conductive electrodes applied on external surfaces of the said reservoir, an excitation signal generator connected to the said capacitive arrangement and detection and measurement means capable of receiving and processing a resulting signal transmitted by the said capacitive arrangement and representing the quantity of consumable product present in the said reservoir, characterised in that the said capacitive arrangement has capacitors associated with the said volume and comprising at least two electrodes applied on two opposite faces of the reservoir, and in that these two electrodes are situated on either side of the said volume where the product is in the captive state and offset with respect to one another in order to be located respectively in the vicinity of two opposite ends of this volume.

By way of a preferred application, the said reservoir made of insulating material comprises at least one upstream compartment where the said product is in the free state and one downstream compartment giving substance to an aforementioned volume where the said product is in the captive state, the two compartments communicating by means of a passage.

According to one possible embodiment, the ink in the downstream compartment impregnates a porous body. It has been noted that such a porous body impregnated with a conductive ink behaves as an impedance with however an essentially real component. It is in this sense that it can be considered that the ink is conductive as indicated above, including in the downstream compartment.

According to another possible embodiment, the device is again characterised in that capacitors associated with the upstream compartment, comprising two electrodes applied on two faces of the upstream compartment, each extend over at least part of the said face being disposed facing one another so as to flank at least part of the said upstream compartment situated in the vicinity of the said passage.

Thus two electrodes respectively applied against faces of the two compartments are joined together and connected to the excitation signal generator, which may be a high-frequency alternating signal generator, while two electrodes respectively applied against other faces of these two compartments are joined together and connected to the said detection means. These therefore receive a signal returned or transmitted by the capacitive arrangement in response to the excitation signal delivered by the said generator and this signal represents the quantity of liquid product remaining in the reservoir. The detection means may include an envelope detector and, in cascade with the latter, an analogue to digital converter connected to convert the signal coming from the envelope detector into digital information.

Where such a device for determining the quantity of product contained in the reservoir is associated with a document printing device, the microprocessor-based main processing circuit of this printing device controls the input of information at the detection device, while the read-only memory associated with this main processing circuit contains information representing the quantity of ink remaining, corresponding to the digital information transmitted by the detection means. The printing device also has display means making it possible, among other things, to display information indicating the quantity of ink remaining in the reservoir and/or a message informing the user of the necessity of taking action.

The metallic electrodes applied against the walls of the reservoir may be either plates carried by a support, generally a carriage on which the said reservoir is mounted, or plates fixed directly on the wall of the reservoir, or metallizations of the said wall.

The invention also concerns any automated office machine, characterised in that it has a device for determining the quantity of liquid consumable product remaining in a reservoir, in accordance with the preceding definition, or a document printing device incorporating such a device for determining a quantity of ink remaining in at least one reservoir. Such an automated office machine may for example constitute essentially a facsimile machine or a printer or a microcomputer having at least one device in question.

It should be noted that the structure of the capacitive arrangement defined above, in accordance with the invention, is particularly adapted so that the signal transmitted by it has a large variation, in this case a variation in amplitude, at the instant the upstream compartment empties completely.

The complete disappearance of conductive liquid product in the upstream compartment results in an appreciable drop in the capacitance of the capacitor or capacitors associated with this upstream compartment on account of these capacitors, as it were, disappearing. However, this sudden drop might not be perceptible on account of the downstream compartment capacitors being in fact connected in parallel to the upstream compartment capacitors, which would have the effect of "masking" the considerable drop in capacitance of the upstream compartment capacitors.

Consequently, by adapting the capacitance of the downstream compartment capacitors to that of the upstream compartment capacitors when the latter compartment is almost empty but still contains a certain quantity of product, the sudden variation in capacitance of the capacitors associated with the upstream compartment, at the instant the latter empties completely, can be made more conspicuous.

This is what is achieved, notably and not exclusively, by the L shape of the electrodes.

Moreover, each electrode applied against a face of the downstream compartment extends only over part of the face against which it is applied, the two electrodes being offset with respect to one another (so to speak diagonally with respect to the said compartment) in order to be located respectively in the vicinity of two opposite ends of the said downstream compartment.

The fact of offsetting the metallic electrodes associated with the downstream compartment makes it possible to obtain a greater measurement accuracy during the phase of monitoring the quantity of product remaining in the downstream compartment. This is because the concentration of conductive product in the porous body modifies the electrical behaviour of the latter, notably its resistivity. The product being conductive, a high concentration of product in the porous body corresponds to a low resistivity. The drying out of the porous body corresponds to an increase in this resistivity. The fact that the electrodes are offset as indicated allows the electrical signal to pass through both the low-resistivity and high-resistivity areas of the entire downstream compartment while the latter empties. On the other hand, if the two metallic electrodes were placed facing one another, the electrical signal would pass through the area where the resistivity is lowest, which would reduce the accuracy of the measurement.

According to another noteworthy characteristic, the capacitive arrangement is such that it has two groups of electrodes each composed of one upstream compartment electrode and one downstream compartment electrode, electrically interconnected. Preferably, the aforementioned two faces of the upstream compartment and the aforementioned two faces of the downstream compartment, against which the electrodes in question are applied, are respectively coplanar in pairs and the electrodes of the same group are applied against two such coplanar faces and form a single metallic component. The upstream compartment electrodes may be shaped and dimensioned in order to cover substantially the whole of the faces of the upstream compartment on which they are applied. The combination of all these characteristics results in the fact that an aforementioned group of two electrically linked electrodes (one for the upstream compartment and the other for the downstream compartment) forms an L-shaped metallic component or metallization. Furthermore, the two metallic components or metallizations in the shape of an L constituting the two groups of aforementioned electrodes are disposed facing one another and head to tail. This structure is considered to be the one which gives the best results. In the case of a reservoir of simple geometric form, for example essentially a right-angled parallelepiped, the electrodes are distributed and applied against two opposite parallel walls of the reservoir.

The invention also concerns any ink refill cartridge for a document printing device having a reservoir at least with two compartments, characterised in that conductive surfaces carried externally by faces of this reservoir form L-shaped capacitor electrodes disposed head to tail making it possible to define a capacitive arrangement for determining the level of ink remaining in the reservoir, a capacitive arrangement in accordance with the preceding definition.

Furthermore, the reservoir may have a refilling aperture opening into the upstream compartment. In this case, the messages sent by the display device can indicate to the user the necessity of refilling the reservoir.

BRIEF DESCRIPTION OF THE FIGURES

The invention will be better understood and other advantages of it will emerge more clearly in the light of the following description of a document printing device in accordance with the invention and including notably a device for determining the quantity of ink remaining in a reservoir complying with the preceding definition, given solely by way of example and produced with reference to the accompanying drawings in which:

FIG. 2 is a simplified perspective view of this same printing device;

FIG. 5 is a schematic partial view of the capacitive arrangement viewed in the direction of the arrow V of FIG. 2;

DETAILED DESCRIPTION OF THE PREFERRED EMBODIMENTS

Figure 1:
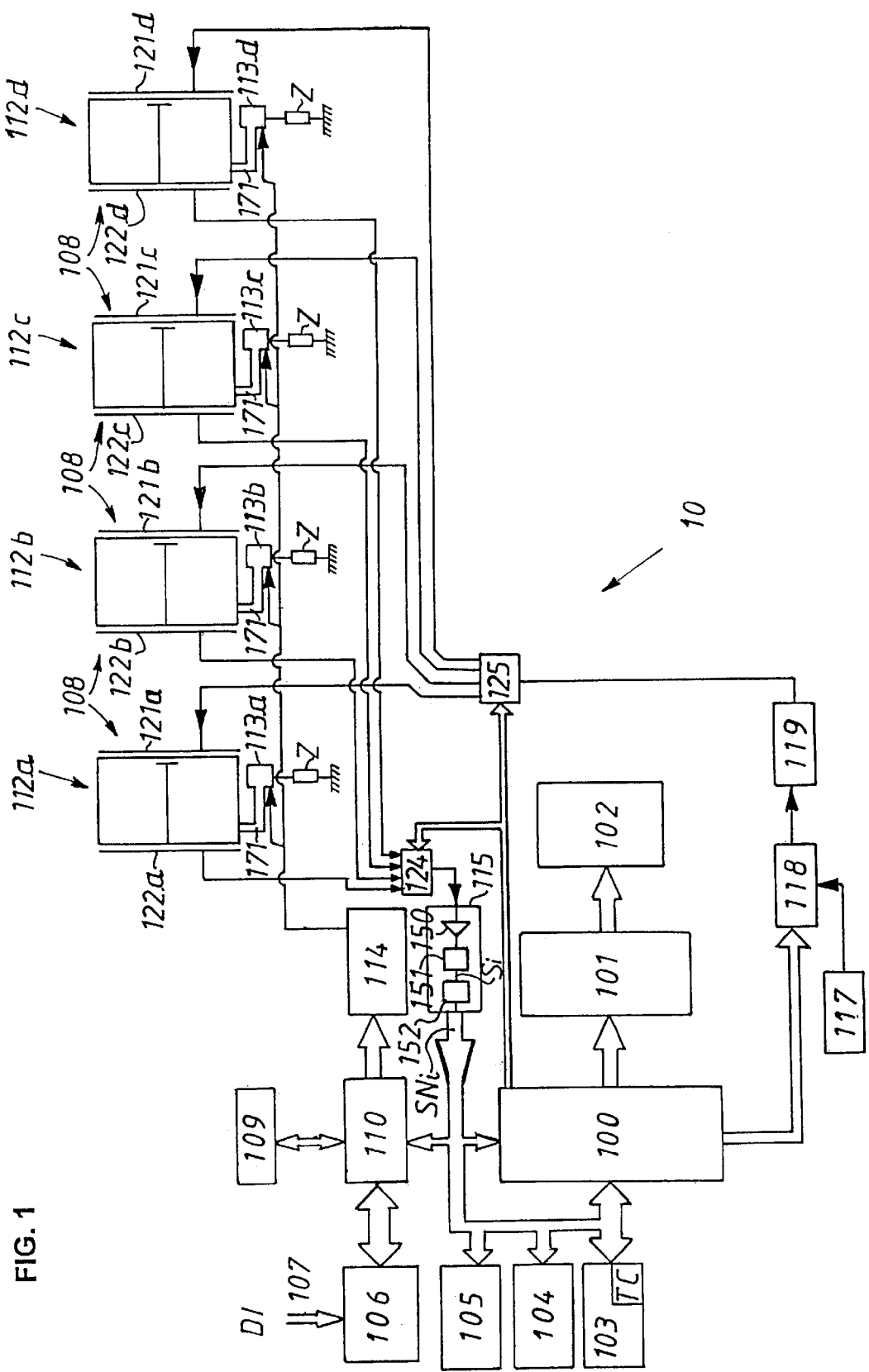
FIG. 1 is a block diagram of a preferred embodiment of the printing device.
Figure 3:
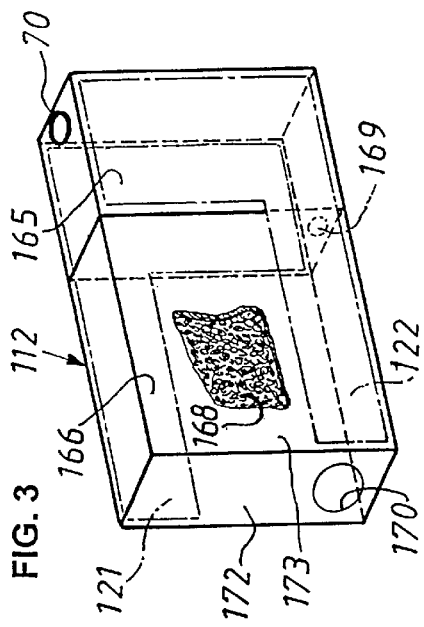
FIG. 3 is a simplified and schematic view of a reservoir of this printing device, with partial stripping away.

Referring more particularly to FIGS. 1 to 3, a colour printer 10 has been depicted which receives data to be printed DI, representing text or an image, by means of a parallel input/output port 107, connected to an interface circuit 106 itself connected to an ink ejection control circuit 110 which controls four print heads 113a, 113b, 113c, 113d by way of an amplification circuit 114. Each print head is connected to a reservoir of ink or similar pigmented product, allowing colour printing. The four reservoirs 112a, 112b, 112c, 112d contain inks or other liquid pigmented products of different colours, in this case, yellow, cyan, magenta and black. The reservoir 112a filled with black ink has a volume substantially larger than that of the other three. The print heads and reservoirs are mounted on a carriage 60 constrained to move along a guidance means 67 formed by rails. The carriage 60 is moved with reciprocating motion along these guidance rails. It is driven by a motor 102 by means of a belt device, not depicted but conventional and well known to persons skilled in the art. The movement path of the carriage and therefore of the print heads 113a–113d is parallel to a line to be printed on a print medium such as a sheet of paper. This print medium is moved perpendicular to the movement path of the carriage by the printer mechanism, known per se.

The printer also has a main data processing circuit 100 associated with a read-only memory 103 and with a random access memory 109. The read-only memory 103 contains the operating programs of the main processing circuit while the random access memory 109, also associated with the ink ejection control circuit 110, temporarily stores the data received by means of the interface 106 as well as the data produced by the main processing circuit 100. The latter is connected to a display 104 on which it controls the display of messages representing the operation of the printer.

As will be seen later, information on the quantities of ink remaining in the four reservoirs respectively associated with the four print heads appears among these messages. The main processing circuit 100 is connected to a keypad 105 by means of which the user can transmit operating commands to the printer. The processing circuit also controls the motor 102 for driving the carriage by means of an amplification circuit 101. This motor is here advantageously of the stepping type.

The printing device is itself equipped with a device for determining the quantities of pigmented products respectively contained in the reservoirs. This determination device comprises a capacitive arrangement 108 including at least two metallic conductive electrodes 121, 122 associated with each reservoir. A so-called sending electrode 121 connected to an excitation signal generator 117 by way, notably, of an amplifier 119, and a so-called receiving electrode 122 connected to detection and measurement means 115 capable of receiving and processing a signal transmitted by the said capacitive arrangement (in fact part of the latter) and representing the quantity of product present in a corresponding reservoir, are distinguished.

The electrodes 121a, 122a correspond to the reservoir 112a, the electrodes 121b, 122b correspond to the reservoir 112b, the electrodes 121c, 122c correspond to the reservoir 112c and the electrodes 121d, 122d correspond to the reservoir 112d. The forms and characteristics of these electrodes will be described in detail later.

The detection and measurement means 115 are connected to the said receiving electrodes by way of first controlled selection means 124 making it possible to successively and cyclically select at least one electrode (possibly a group of electrodes), associated each time with a particular reservoir, in order to successively determine the quantities of product remaining in the different reservoirs, during one measurement cycle. Likewise, the excitation signal generator 117 is connected to the said sending electrodes by way of second controlled selection means 125, in order to successively and cyclically select at least one electrode (possibly a group of electrodes) associated each time respectively with this same aforementioned particular reservoir.

In the example, the excitation signal generator 117 is a high-frequency alternating signal generator connected to the input of the amplifier 119 by means of a switch 118 controlled by the main processing circuit 100. The first and second selection means 124, 125 are also controlled by the main processing circuit 100. The aforementioned detection and measurement means 115 include an envelope detector 151 connected to be linked to at least one receiving electrode selected by means of the said first selection means. An amplifier 150 is inserted between the selection means 124 and the input of the envelope detector. These detection and measurement means also include an analogue to digital converter 152 connected to convert a signal Si coming from the envelope detector into digital information SNi. This digital information is transmitted and used by the main processing circuit 100. In particular, the read-only memory 103 contains a look-up table TC where information representing the quantity of pigmented product remaining in a reservoir appears in correspondence with the digital information transmitted by the analogue to digital converter 152.

The main processing circuit 100 therefore performs a comparison between the information delivered by the converter 152 and the table TC, in order to determine the quantity of pigmented product remaining in such and such reservoir. According to such a comparison it produces information and messages intended to be reproduced on the display 104 and/or transmitted on a link BUS to other operating systems.

The reservoirs 112a, 112d are installed side by side on a support 156 carried by the carriage 60; they are removable and exchangeable. The installation of a reservoir on this support results in its connection to the corresponding print head 113a–113d. The four print heads are installed permanently on the carriage 60.

According to another conventional embodiment, not depicted, each reservoir 112 and the corresponding print head 113 form one and the same exchangeable cartridge. If the reservoirs are exchangeable, one of the messages produced by the main processing circuit can indicate the necessity of changing such and such reservoir. If, on the contrary, the reservoirs are intended to be refilled when this is necessary, they each have a refilling aperture 70 and one of the messages produced by the main processing circuit can indicate the necessity of refilling such and such reservoir.

The reservoirs 112a–112d installed side by side on the support 156 are not depicted in FIGS. 2 and 5, but their locations are marked by the references 112a–112d in FIG. 2. This support 156 comprises separators 157, 158, 159 between which reservoirs are inserted. In the example, the separators form parallel walls. Each separator carries two electrodes 121 or 122, respectively associated with the two neighbouring reservoirs and these two electrodes are, for each separator, either sending electrodes 121, that is to say ones connected to the second selection means 125, or receiving electrodes 122, that is to say ones connected to the first selection means 124. The support 156 also has two end retainers 161, 162 to hold the two reservoirs 112a, 112d which are closest to the lateral edges of the carriage 60. These end retainers are in the form of parallel walls similar to the separators. Each retainer carries an electrode associated with the neighbouring reservoir.

More precisely, in accordance with the preceding description and according to one possible configuration, the retainer 161 carries the electrode 121a, the separator 158 carries the electrodes 122a, 122b, the separator 159 carries the electrodes 121b and 121c, the separator 160 carries the electrodes 122c and 122d and the retainer 162 carries the electrode 121d.

Each electrode is here composed of a metallic plate. At least one electrode per reservoir may advantageously be applied by elastic stressing means against the wall of the corresponding reservoir. The same applies for the electrode carried by at least one end retainer. Such stressing means may be implemented by one or more leaf springs 160 or similar.

As stated previously, the separators are not necessarily parallel walls, notably when the electrodes are defined by metallizations deposited on external surfaces of the reservoirs, as depicted in faint lines in FIG. 3. In this case, the separators and the end retainers may define a simple structure for housing the reservoirs and carry electrical connection elements making it possible, by simple contact, to connect the different electrodes to the selectors.

This particular layout of sending and receiving electrodes is optimum for reducing the parasitic effects, more or less accentuated according to the crosstalk levels existing between the cables and the different channels of the said first and second selection means 124, 125.

It should also be noted that this particular layout of sending and receiving electrodes may make it possible to simplify the selection means as described with reference to FIG. 1. In particular, removal of the second selection means 125 can be envisaged. In this case, all the aforementioned sending electrodes 121a–121d are interconnected directly together and linked to the excitation signal generator 117, and more particularly to the output of the amplifier 119.

Another advantageous characteristic of the device described resides in the particular form of the electrodes, making it possible to obtain good measurement sensitivity whatever the fill level of the reservoir 112 which is checked, in the particular case where this reservoir comprises two compartments, respectively an upstream compartment 165 where the product is in the free state and a downstream compartment 166 where it is in the captive state. The distinctive terms upstream and downstream are chosen according to the direction of flow of the product, as it is consumed. The downstream compartment is here filled with a porous body 168 in which the liquid pigmented product is in the so-called captive state. The compartments communicate by means of a passage 169 and the downstream compartment communicates with a flow output 170 for the consumption of the pigmented product, this output being of course connected to the corresponding ink-jet print head 113 by a channel 171. This type of reservoir is known. If it has a refilling aperture 70, this is located in the upper part of the upstream compartment.

Furthermore, in the example described, it contains a conductive pigmented product. Its walls are made of insulating material, that is to say, here, of plastic.

As depicted in FIG. 3, each reservoir 112 as a whole has the form of a right-angled parallelepiped and the two electrodes 121, 122 are applied against two opposite and parallel faces of the said reservoir. They extend facing both the upstream compartment 165 and the downstream compartment 166. The particular form of these electrodes will be explained later. It should be noted that the electrodes can be metallic plates or metallizations carried by the parallel faces of the reservoir.

A colour reproduction unit comprising four reservoirs and print heads has been described, but the invention applies whatever the number of reservoirs, including for a device having only a single reservoir, for black and white printing.

According to an important characteristic of the invention, the aforementioned electrodes form part of capacitors of the capacitive arrangement and concern firstly the volume where the product is in the captive state in such a reservoir. Such electrodes are situated on either side of the said volume and offset with respect to one another in order to be located respectively in the vicinity of two opposite ends of this volume.

Figure 9:
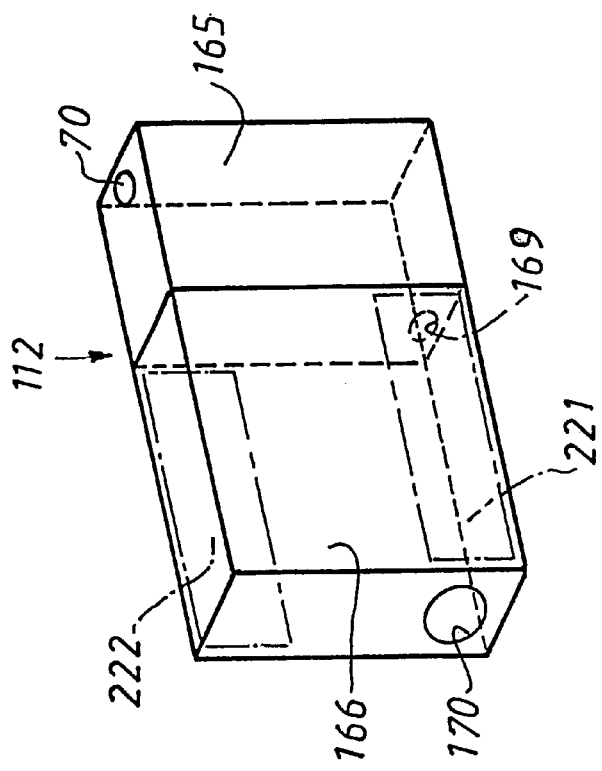

This is in accordance with the embodiment illustrated in FIG. 9. In this basic configuration, the electrodes 221, 222 relate only to the downstream compartment. No attempt is made to measure the quantity of pigmented product contained in the upstream compartment but only the decrease in the quantity of product contained in the downstream compartment when the latter can no longer be re-supplied by the upstream compartment, that is to say when the reservoir is almost empty but nevertheless still usable for a certain time.

In this case, the two electrodes extend only over part of the surfaces facing the downstream compartment and are offset as indicated above.

Figure 10:
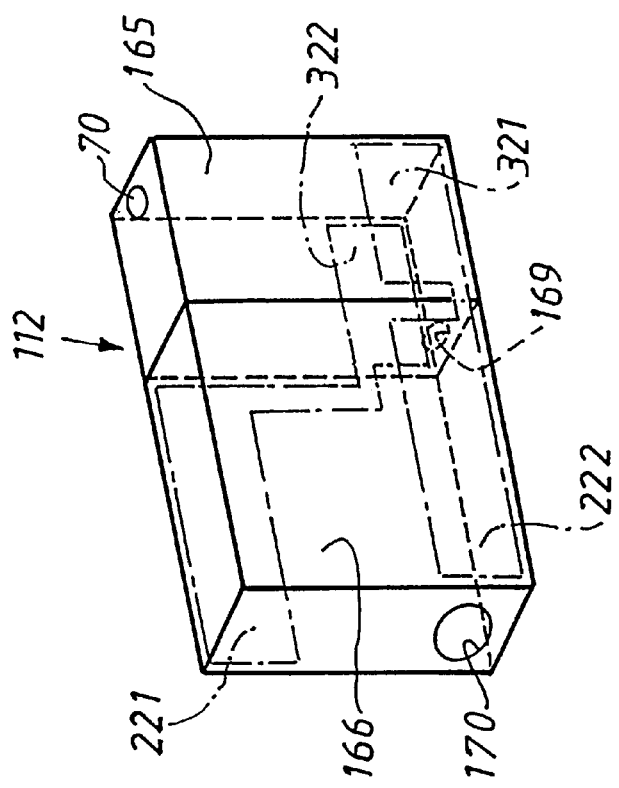
FIGS. 9 and 10 are views similar to FIG. 3 illustrating variants.

The configuration of FIG. 10 shows the electrodes 221, 222 again, and capacitors are provided associated with the upstream compartment, comprising two electrodes 321, 322 applied on two faces of the said upstream compartment and each extending over at least part of the said face, being disposed facing one another so as to flank at least part of the upstream compartment situated in the vicinity of the passage 169 between the upstream compartment 165 and the downstream compartment 166.

In this example, there are therefore two groups of electrodes 221, 321 and 222, 322 each composed of one upstream compartment electrode and one downstream compartment electrode, electrically interconnected. As the reservoir has the form of a right-angled parallelepiped, the aforementioned two faces of the upstream compartment and the aforementioned two faces of the downstream compartment, against which the said electrodes are applied, are respectively coplanar in pairs and the electrodes of the same group are applied against these two coplanar faces and form a single metallic component.

This is also the case of the preferred embodiment of FIGS. 1 to 3 where each electrode can be considered as being constituted by two electrodes joined together as a group forming only a single component. Unlike the embodiment of FIG. 10, the electrodes of the said upstream compartment are shaped and dimensioned to cover substantially the whole of the faces of the upstream compartment 165 on which they are applied. This thus results in an aforementioned group of two electrodes joined together electrically forming one L-shaped metallic component or metallization, the two metallic components or metallizations in the shape of an L being disposed facing one another and head to tail. The parts surrounding the upstream compartment are facing one another, while the parts surrounding the downstream compartment are offset, in accordance with the invention.

Figure 6:
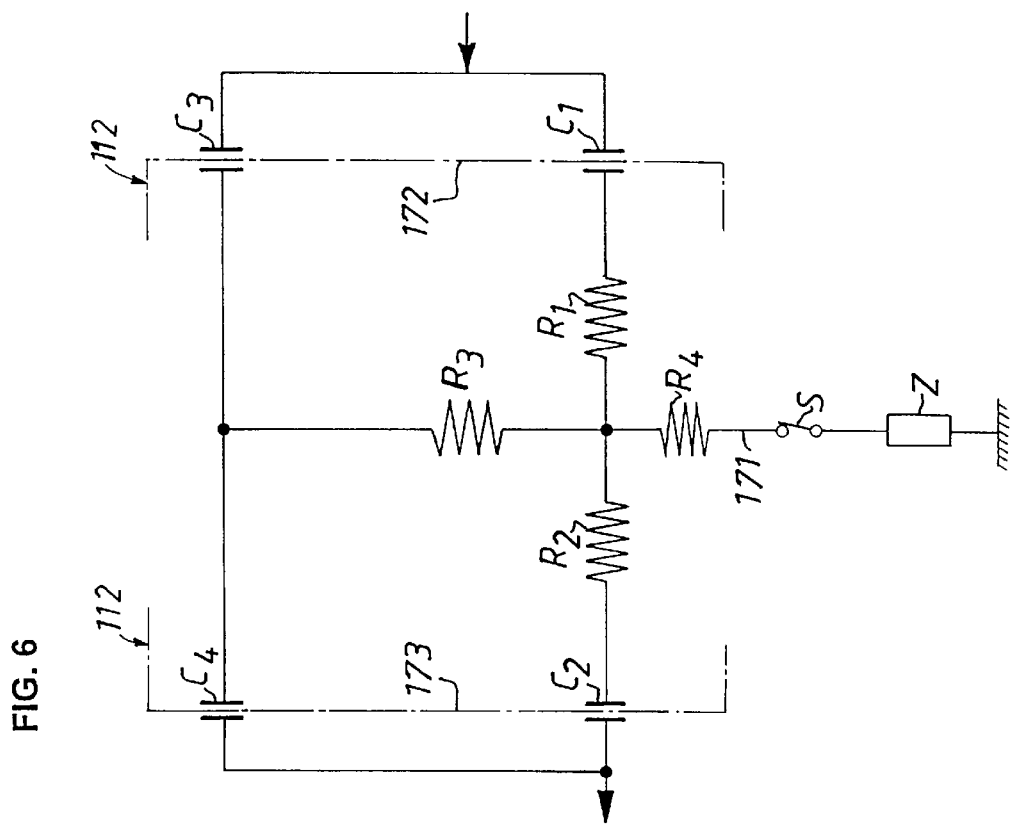
FIG. 6 is an equivalent electrical diagram of part of the capacitive arrangement associated with a reservoir and with the corresponding print head.

The equivalent electrical diagram of FIG. 6 can be assigned to such a reservoir 112 provided with its two L-shaped electrodes 121, 122 and associated with the corresponding print head 113.

The so-called "sending" electrode 121 defines, with the downstream compartment, a capacitor $C_1$ and, with the upstream compartment, a capacitor $C_3$. The dielectric of these two capacitors is constituted by the wall 172 of the reservoir. Likewise, the electrode 122 defines, with the downstream compartment, a capacitor $C_2$ and, with the upstream compartment, a capacitor $C_4$. The common dielectric of these two capacitors is constituted by the opposite wall 173 of the reservoir. As the resistivity inside the upstream reservoir is relatively low, it can be considered that the capacitors $C_3$ and $C_4$ are connected in series.

On the other hand, in the downstream compartment, the resistivity is higher; it increases when the porous body is no longer saturated after the upstream compartment has been completely emptied. Under these conditions, resistors $R_1$ and $R_2$ are inserted in series between the capacitors $C_1$ and $C_2$, a resistor $R_3$ is inserted between the common point of the capacitors $C_3$ and $C_4$ and the common point of the resistors $R_1$ and $R_2$ and a resistor $R_4$ is inserted between the common point of the resistors $R_1$, $R_2$ and $R_3$ and the impedance Z constituted by or representing the print head. The other "terminal" of the impedance Z is connected to earth. A normally closed switch S is interconnected between the resistor R4 and the impedance Z. This switch in fact represents the ink flow duct 171 between the output of the downstream compartment and the print head. It can be considered that this switch S opens when there is no longer any conductive ink in this small-sectioned duct. This can occur in a case of faulty operation but especially when the reservoir is completely empty. When the upstream compartment empties, the capacitances of the capacitors $C_3$ and $C_4$ decrease progressively since the surface area of conductive ink facing the parts of the electrodes applied against the faces of this upstream compartment decreases. Subsequently, when the upstream compartment is empty and the downstream compartment dries out until completely drained of ink, it is the capacitances $C_1$ and $C_2$ which progressively decrease. At the same time, the values of the resistors $R_1$ to $R_4$ increase.

Finally, when the ink runs out in the small-sectioned duct 171 which connects the downstream compartment to the print head, from the electrical point of view, everything happens as if the switch S were opened, isolating the part of the capacitive arrangement associated with this reservoir from the print head and consequently, from earth.

All these variations result in a significant decrease in the high-frequency alternating voltage transmitted by the capacitive arrangement as the quantity of conductive ink in the reservoir in question decreases.

Figure 4:
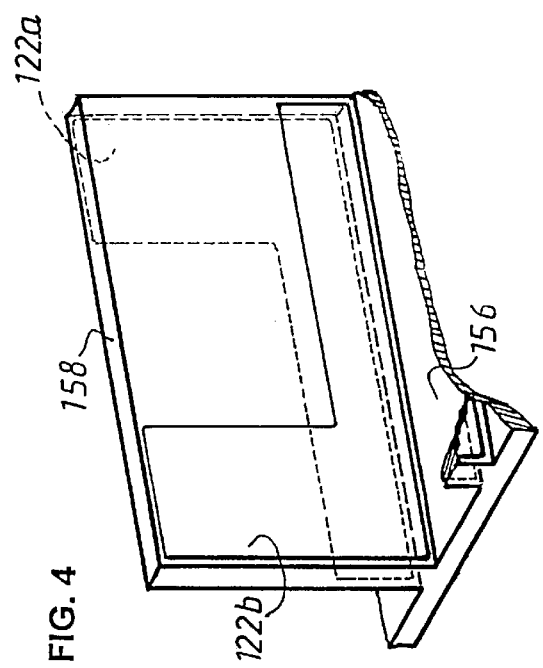
FIG. 4 is a detailed perspective view showing a separator disposed between two reservoirs and carrying two electrodes.

As can be seen in FIGS. 3 and 4, the two metallic electrodes associated with one and the same reservoir are arranged in a manner which is specific and at present considered optimum, making this variation in the transmitted voltage more characteristic and more usable.

Figure 7:
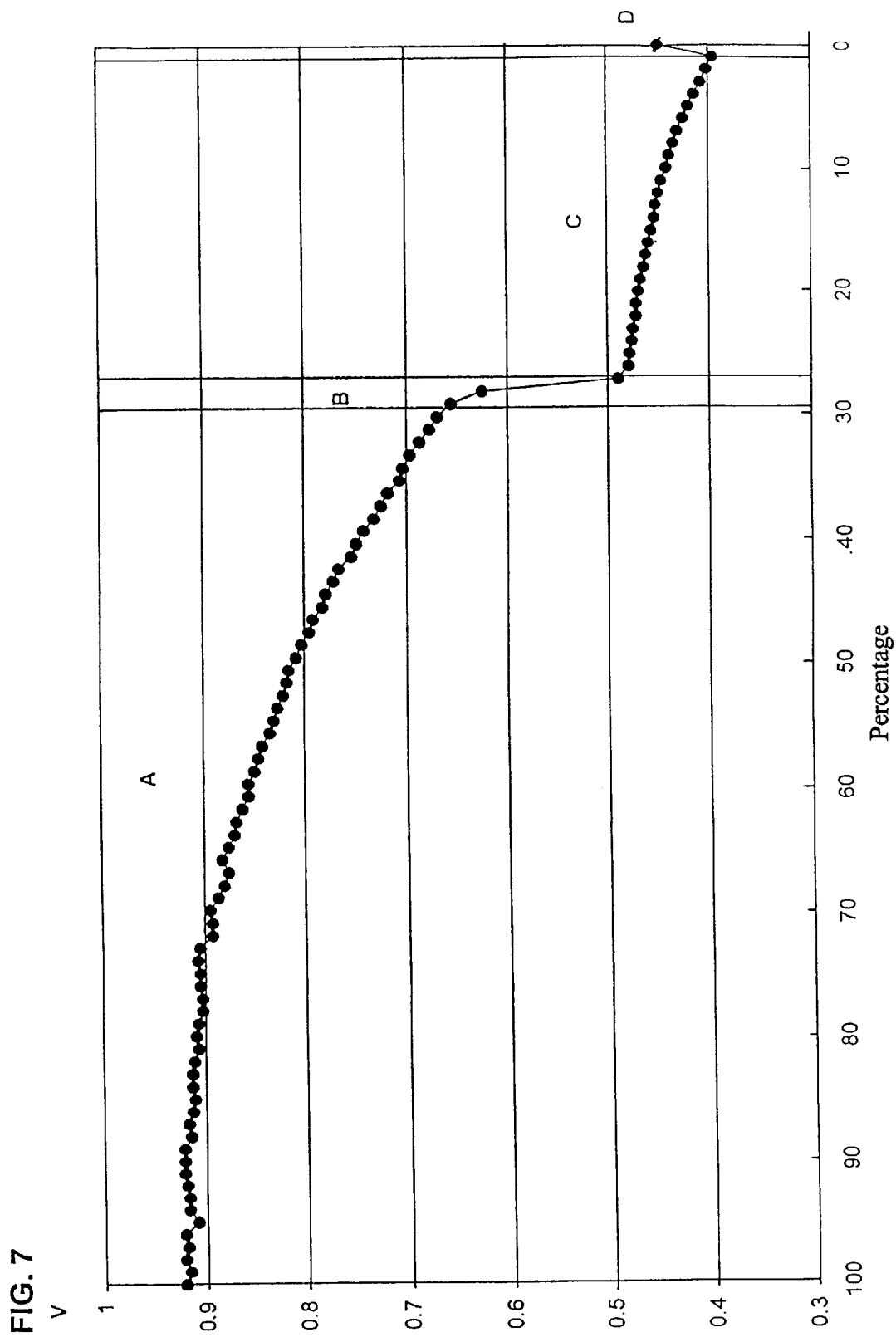
FIG. 7 is a graph illustrating the voltage of the signal transmitted by the capacitive arrangement according to the quantity of ink remaining in the reservoir.

FIG. 7 illustrates this variation in the amplitude of the alternating signal transmitted by the capacitive arrangement according to the percentage of product remaining in the reservoir. Over the first part (zone A) the voltage of the signal sensed by the detection and measurement means 115 decreases slowly. This change corresponds to the drop in level in the upstream compartment until the latter is completely drained (zone B).

Zone C corresponds to the progressive drying out of the porous body. Zone D corresponds to the "opening" of the switch S, that is to say to the disappearance of the product in the duct 171 connecting the flow output to the corresponding print head 113.

Figure 8:
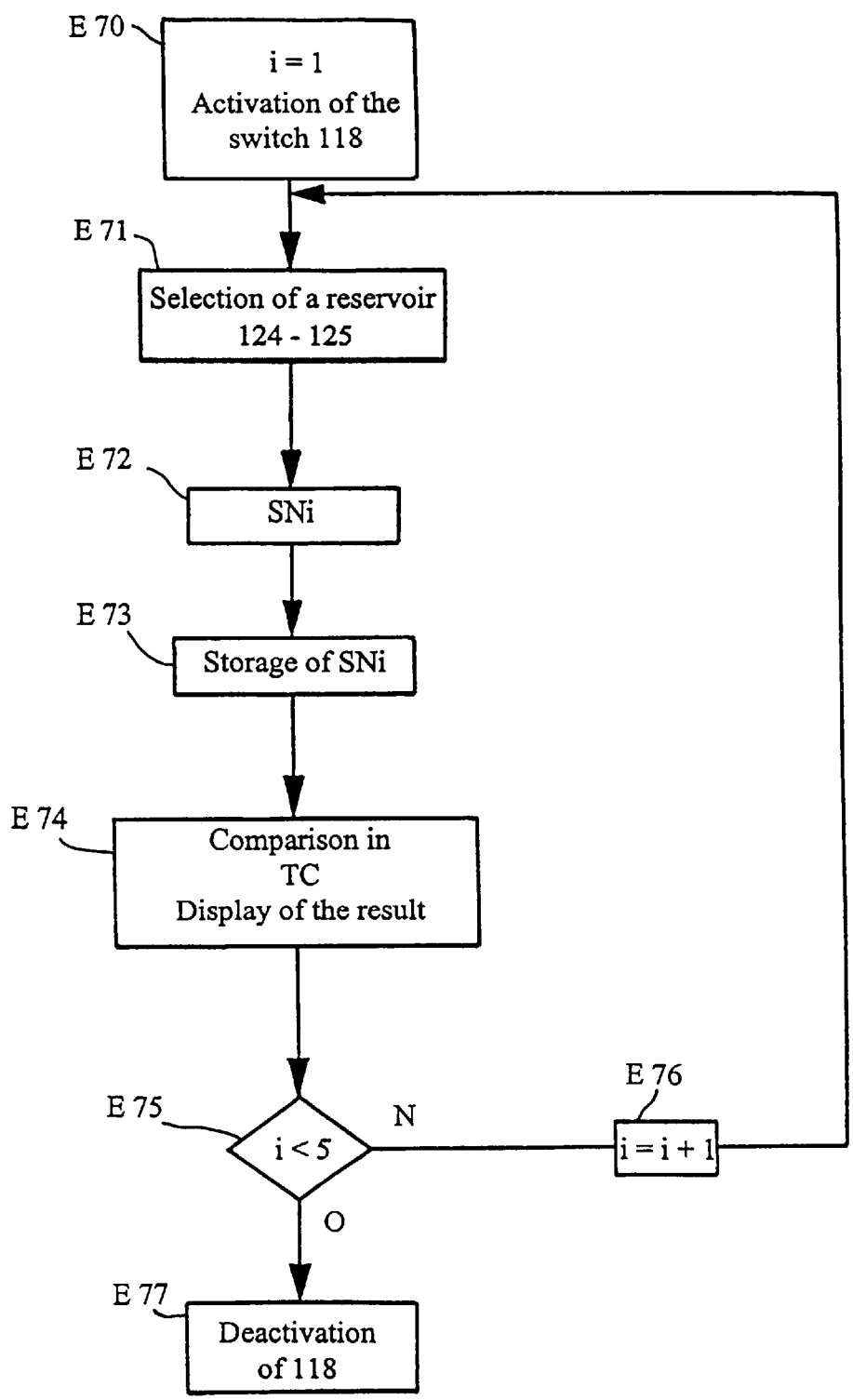
FIG. 8 is a flow diagram of a program residing in read-only memory and implementing the invention.

FIG. 8 is an algorithm which illustrates the operation of the means of determining the quantities of products respectively contained in the reservoirs. This algorithm comprises eight steps, E70 to E77, which are performed periodically when the main processing circuit controls the said selection means. Preferably, this cycle takes place when the carriage is in a predetermined position and the system is not in normal printing operation. This algorithm can then take place before the printing of a document page. It makes it possible to determine the quantity of ink remaining in each reservoir.

The step E70 consists of positioning the switch 118 to allow passage of the signal delivered by the oscillator 117 to the amplifier. The number $i$ of reservoirs to be checked is initialised; i=1.

At E71, one reservoir from the four is selected, with the help of the said first and second selection means 124, 125, controlled by the main processing circuit 100.

At the step E72, the high-frequency alternating signal which is transmitted to the detection and measurement means 115 by the part of the capacitive arrangement which is concerned, is converted into digital information. This information SNi is stored in the random access memory at the step E73. The main processing circuit then consults the look-up table TC written in read-only memory in order to determine the quantity of ink corresponding to the information SNi. The step E75 is a test which checks whether the number i of cartridges to be measured is less than 5. In the negative, i is incremented by one unit at the step E76 and the process returns to the step E71. Each step E74 is accompanied by a display of the quantity of ink present in the corresponding reservoir. When the result of the test E75 is positive, that is to say when i is equal to 5, all the reservoirs have been checked and the main processing circuit goes to the step E77, which deactivates the switch 118. At this time, the results of the measurements are displayed on the display means possibly accompanied by a message indicating to the user the necessity of taking action, either by changing such and such reservoir, or by refilling it with conductive pigmented product, using the refilling aperture opening into the upstream compartment.

What is claimed is:

1. A device for determining a quantity of electrically conductive liquid consumable product comprising: a reservoir made of insulating material, and including at least one generally cubic volume where the product is in a captive state, and having a capacitive arrangement including first and second conductive electrodes applied on external surfaces of said reservoir, an excitation signal generator connected to said capacitive arrangement and a detection and measurement unit adapted to receive and process a resulting signal transmitted by said capacitive arrangement and representing the quantity of consumable product present in said reservoir, wherein said capacitive arrangement has capacitors associated with said volume and comprises two electrodes applied on two opposite faces of said reservoir, said two electrodes being situated on either side of said volume where the product is in the captive state and being completely offset with respect to one another in a diagonal direction of the generally cubic volume such that there is no overlap of any portion of said two electrodes in a lateral direction of the generally cubic volume.

2. A device according to claim 1, wherein said reservoir made of insulating material comprises at least one upstream compartment where the product is in a free state and one downstream compartment that includes said volume where the product is in the captive state, the two compartments communicating by means of a passage.

3. A device according to claim 2, wherein said capacitive arrangement includes capacitors associated with the upstream compartment that comprise third and fourth electrodes applied on and extending over at least part of first and second respective faces of the upstream compartment.

4. A device according to claim 2 or 3, wherein said downstream compartment is filled with a porous body in which the product is in the captive state.

5. A device according to claim 4, wherein said excitation signal generator is a high-frequency alternating signal generator, and has a switch connected to link said generator to a first set of said electrodes.

6. A device according to claim 5, wherein said detection and measurement unit includes an envelope detector connected to be linked to a second set of said electrodes.

7. A device according to claim 6, wherein said detection and measurement unit includes an analogue to digital converter connected to convert a signal coming from said envelope detector into digital information.

8. A device according to claim 6, having a plurality of said reservoirs containing respective electrically conductive liquid consumable products, further comprising a first selection unit arranged between said detection and measurement unit and said second set of electrodes.

9. A device according to claim 8, further comprising a second selection unit arranged between said high-frequency alternating signal generator and said first set of electrodes said capacitive arrangement, on the other hand.

10. A device according to claim 2 or 3, having a first group and a second group of electrodes each composed of one upstream compartment electrode and one downstream compartment electrode, both electrodes of said first group being electrically interconnected and both electrodes of said second group being electrically interconnected.

11. A device according to claim 10, wherein the face of said upstream compartment and the face of said downstream compartment on which the electrodes of said first group are applied are coplanar, the electrodes of the first group forming a single metallic component, and wherein the face of said upstream compartment and the face of said downstream compartment on which the electrodes of said second group are applied are coplanar and the electrodes of said second group forming a single metallic component.

12. A device according to any one of claims 1–3, wherein said electrodes are distributed and applied against two opposite parallel walls of said reservoir.

13. A device according to any one of claims 1–3, wherein said reservoir contains a conductive ink, for printers.

14. A device according to any one of claims 1–3, wherein said reservoir has a refilling aperture that opens into said upstream compartment.

15. A document printing device having:

at least one reservoir of electrically conductive ink associated with a print head;

a carriage;

a guidance construction;

a mechanism for moving a print medium, wherein said carriage carries said reservoir, and is constrained to move along said guidance construction, said guidance construction being arranged facing said mechanism for moving the print medium, and wherein said reservoir is made of insulating material and includes at least one generally cubic volume containing the product in a captive state, said volume communicating with a flow output connected to said print head;

an ink measuring unit adapted to determine the quantity of ink remaining in said reservoir, wherein said ink measuring unit comprises a capacitive arrangement including first and second conductive electrodes applied on external surfaces of said reservoir, an excitation signal generator connected to said capacitive arrangement and a detection and measurement unit adapted to receive and process a resulting signal transmitted by said capacitive arrangement and representing the quantity of ink present in said reservoir, and wherein said capacitive arrangement comprises capacitors associated with said volume and comprising said first and second electrodes, applied on two opposite faces of said reservoir, and wherein said first and second electrodes are situated on either side of said volume where the product is in the captive state and are completely offset with respect to one another in a diagonal direction of the generally cubic volume such that there is no overlap of any portion of said two electrodes in a lateral direction of the generally cubic volume.

16. A device according to claim 15, said reservoir made of insulating material comprises at least one upstream compartment where the product is in a free state and one downstream compartment that includes said volume where the product is in the captive state, the two compartments communicating by means of a passage.

17. A device according to claim 16, wherein said capacitive arrangement includes capacitors associated with said upstream compartment that comprise third and fourth electrodes applied on and extending over at least part of first and second respective faces of said upstream compartment.

18. A device according to claim 16 or 17, wherein said downstream compartment is filled with a porous body in which the ink is in the captive state.

19. A device according to claim 16 or 17, having a first group and a second group of electrodes each composed of one upstream compartment electrode and one downstream compartment electrode, both electrodes of said first group being electrically interconnected, and both electrodes of said second group being electrically interconnected.

20. A device according to claim 19, wherein the face of said upstream compartment and the face of said downstream compartment on which the electrodes of said first group are applied are coplanar, the electrodes of the first group forming a single metallic component, and wherein the face of said upstream compartment and the face of said downstream compartment on which the electrodes of said second group are applied are coplanar and the electrodes of said second group forming a single metallic component.

21. A device according to claim 19, wherein said excitation signal generator is a high-frequency alternating signal generator, and has a switch connected to link said generator to a first set of said electrodes of said capacitive arrangement.

22. A device according to claim 21, wherein said detection and measurement unit includes an envelope detector connected to be linked to a second set of said electrodes of said capacitive arrangement.

23. A device according to claim 22, having a plurality of said reservoirs containing different inks, further comprising a first selection unit arranged between said detection and measurement unit and said second set of electrodes.

24. A device according to claim 23, further comprising a second selection unit arranged between said high-frequency alternating signal generator on and said first set of electrodes.

25. A device according to claim 23, wherein said main processing circuit is adapted to control said first and/or second selection if said carriage is located in a predetermined position.

26. A device according to claim 24, wherein said detection and measurement unit includes an analogue to digital converter connected to convert a signal coming from said envelope detector into digital information.

27. A device according to claim 26, further comprising a main processing circuit and a read-only memory in which is written information representing the quantity of ink remaining, corresponding to the digital information transmitted by said detection and measurement unit.

28. A device according to claim 16 or 17, wherein said electrodes are distributed and applied against two opposite parallel walls of said reservoir.

29. A device according to claim 16 or 17, wherein said reservoir has a refilling aperture that opens into said upstream compartment.

30. A device according to one of claims 15–17, a display, adapted to display information representing the quantity of ink remaining in said reservoir.

31. An automated office machine, comprising a device according to one of claims 15–17.

32. An automated office machine according to claim 31, wherein said machine constitutes essentially a facsimile machine.

33. An automated office machine according to claim 31, wherein said machine constitutes essentially a printer.

34. A microcomputer, comprising at least one device according to one of claims 15–17.

\* \* \* \* \*

UNITED STATES PATENT AND TRADEMARK OFFICE
CERTIFICATE OF CORRECTION

PATENT NO. : 6,318,826 B1
DATED : November 20, 2001
INVENTOR(S) : Marie-Hélène Froger et al.

It is certified that error appears in the above-identified patent and that said Letters Patent is hereby corrected as shown below:

<u>Column 12,</u>
Line 1, "electrodes" should read -- electrodes. --.
Line 2, "said capacitive arrangement, on the other hand." should be deleted.

Signed and Sealed this

Tenth Day of September, 2002

Attest:

JAMES E. ROGAN
Attesting Officer
Director of the United States Patent and Trademark Office